No. 607,254. Patented July 12, 1898.
J. MANNY.
CLOTHES RACK FOR BEDSTEADS.
(Application filed Dec. 1, 1897.)
(No Model.)

WITNESSES:
J. P. Appleman
A. M. Wilson

INVENTOR
Joseph Manny.
BY
Henry C. Evert
ATTORNEY.

UNITED STATES PATENT OFFICE.

JOSEPH MANNY, OF BUTLER, PENNSYLVANIA.

CLOTHES-RACK FOR BEDSTEADS.

SPECIFICATION forming part of Letters Patent No. 607,254, dated July 12, 1898.

Application filed December 1, 1897. Serial No. 660,398. (No model.)

*To all whom it may concern:*

Be it known that I, JOSEPH MANNY, a citizen of the United States of America, residing at Butler, in the county of Butler and State of Pennsylvania, have invented certain new and useful Improvements in Clothes-Racks for Bedsteads, of which the following is a specification, reference being had therein to the accompanying drawings.

This invention relates to certain new and useful improvements in clothes-racks, and has for its object to devise a clothes-rack particularly adapted for use in connection with a bedstead, whereby a convenient rack may be provided for the clothes without necessitating the use of a wardrobe.

My improved rack is adapted to be so constructed and arranged as to be folded within the bed-post when not in use, the arms of the rack being adapted to be withdrawn and held at a horizontal position when desired for use, and they may be arranged in one or more of the posts of the foot or head board, as desired.

The invention has for its further object to so construct and arrange the arms of the rack that they may be easily and readily adjustable independently to any desired horizontal position.

The invention finally resides in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
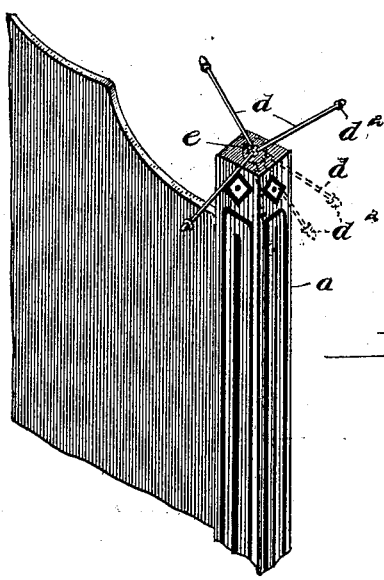
Figure 2:
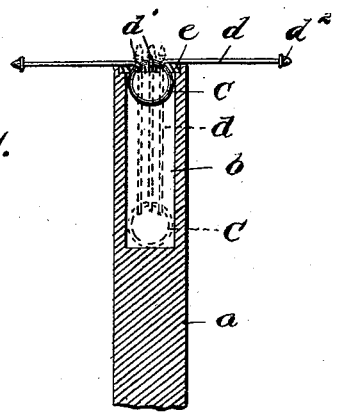
Figure 3:
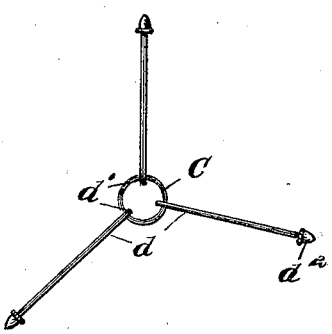
Figure 4:
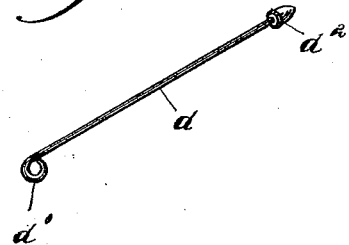

Figure 1 is a perspective view of a portion of a bedstead, showing the arms withdrawn and arranged in their supporting position and also showing in dotted lines the manner in which the same are drawn together so as to enter the recess of the bed-posts. Fig. 2 is a vertical sectional view of a portion of the post, showing the arms in the extended position in full lines and in dotted lines in their position within the recess. Fig. 3 is a plan view of the arms and their securing-ring. Fig. 4 is a perspective view of one of the arms.

Referring to the drawings by reference-letters, $a$ represents the bed-post, which is provided in its upper end with a recess $b$ of any suitable depth as may be required, according to the length of the supporting-arms. This recess is adapted to be of sufficient size that it will receive the split ring $c$, to which are secured the supporting-rods $d$, that may be of any desired number. These supporting-arms may be formed on their fastening end with an eyelet $d'$, which receives the ring, and on their outer end with an ornamental knob $d^2$. The split ring $c$ is retained within its recess by means of the ring $e$, that is recessed in the top of the post and the opening of which is of less diameter than the diameter of the said ring $c$.

When the device is not desired for use, the supporting-arms $d$, of which there may be any desired number attached to the ring, are drawn together, and when brought to a vertical position will descend, together with their ring $c$ into the recess $b$, provided therefor in the post. These arms may be of sufficient length so as to permit the ornamental knobs on the ends of the rods to project above the top of the post and form a grip by which the rods may be withdrawn and brought to their horizontal position, as shown in Figs. 1 and 2, and in which position they will be retained by reason of the greater portion of their weight extending beyond the bed-post.

It will also be noted that various changes may be made in the details of construction without departing from the general spirit of my invention.

Having fully described my invention, what I claim as new, and desire to secure by Letters Patent, is—

1. In a clothes-rack, the combination of a bed-post provided with a longitudinal recess, a ring C operating in said recess, a series of arms secured to and circumferentially adjustable on said ring C, a ring $e$ secured in the upper end of the recess whereby the ring C is retained in the same substantially as herein shown and described.

2. In a clothes-rack, the combination of a bed-post provided with a longitudinal slot $b$, a ring $e$ secured in the upper end of said recess the internal diameter of which is less than the diameter of the slot, a ring C operating in said recess, a series of arms secured to said ring C, the engaging ends of said arms being circumferentially adjustable in relation to each other, substantially as herein shown and described.

In testimony whereof I affix my signature in presence of two witnesses.

JOSEPH MANNY.

Witnesses:
JOHN NOLAND.
WILLIAM E. MINOR.